United States Patent
Price et al.

(10) Patent No.: US 6,640,014 B1
(45) Date of Patent: Oct. 28, 2003

(54) AUTOMATIC ON-THE-FLY FOCUSING FOR CONTINUOUS IMAGE ACQUISITION IN HIGH-RESOLUTION MICROSCOPY

(75) Inventors: Jeffrey H. Price, 3652 Torrey View Ct., San Diego, CA (US) 92130; Miguel Bravo-Zanoguera, La Jolla, CA (US)

(73) Assignee: Jeffrey H. Price ( * ) Notice: Subject to any disclaimer, the term of this patent is extended or adjusted under 35 U.S.C. 154(b) by 0 days.

(21) Appl. No.: 09/235,215

(22) Filed: Jan. 22, 1999

(51) Int. Cl.$^7$ ................................................ H04N 7/18
(52) U.S. Cl. ...................................... 382/255; 358/408
(58) Field of Search ................................ 382/254–259; 358/408, 505, 474–476; 250/201.2, 201.3, 201.4; 359/368, 383

(56) References Cited

U.S. PATENT DOCUMENTS

| | | | |
|---|---|---|---|
| 5,076,662 A | * 12/1991 | Shih et al. | 359/36 |
| 5,132,831 A | * 7/1992 | Shih et al. | 359/107 |
| 5,790,710 A | 8/1998 | Price et al. | 382/255 |
| 2003/0021016 A1 | * 1/2003 | Grier | 359/368 |

FOREIGN PATENT DOCUMENTS

| | | |
|---|---|---|
| WO | WO 96/01438 | 1/1996 |
| WO | WO 96/12981 | 5/1996 |
| WO | WO 98/31150 | 7/1998 |
| WO | WO 98/35256 | 8/1998 |

OTHER PUBLICATIONS

Search Report for PCT/US99/23123.

* cited by examiner

*Primary Examiner*—Thomas D. Lee
*Assistant Examiner*—Stephen Brinich
(74) *Attorney, Agent, or Firm*—Gray Cary Ware & Freidenrich

(57) ABSTRACT

The invention provides an apparatus, and related method, for continuous volume imaging a specimen using imaging a plurality of image planes at predetermined focal depths. The focal depth for each image plane is adjustable in accordance with a variety of desired spatial configurations. The images generated at the image planes are processing in parallel and the image corresponding the an optimal focal depth at an specimen location is selected for imaging the specimen at that location. The volume imaging apparatus of the invention allows for rapid scanning of an entire microscope slide at high image resolution.

3 Claims, 14 Drawing Sheets

(1 of 14 Drawing Sheet(s) Filed in Color)

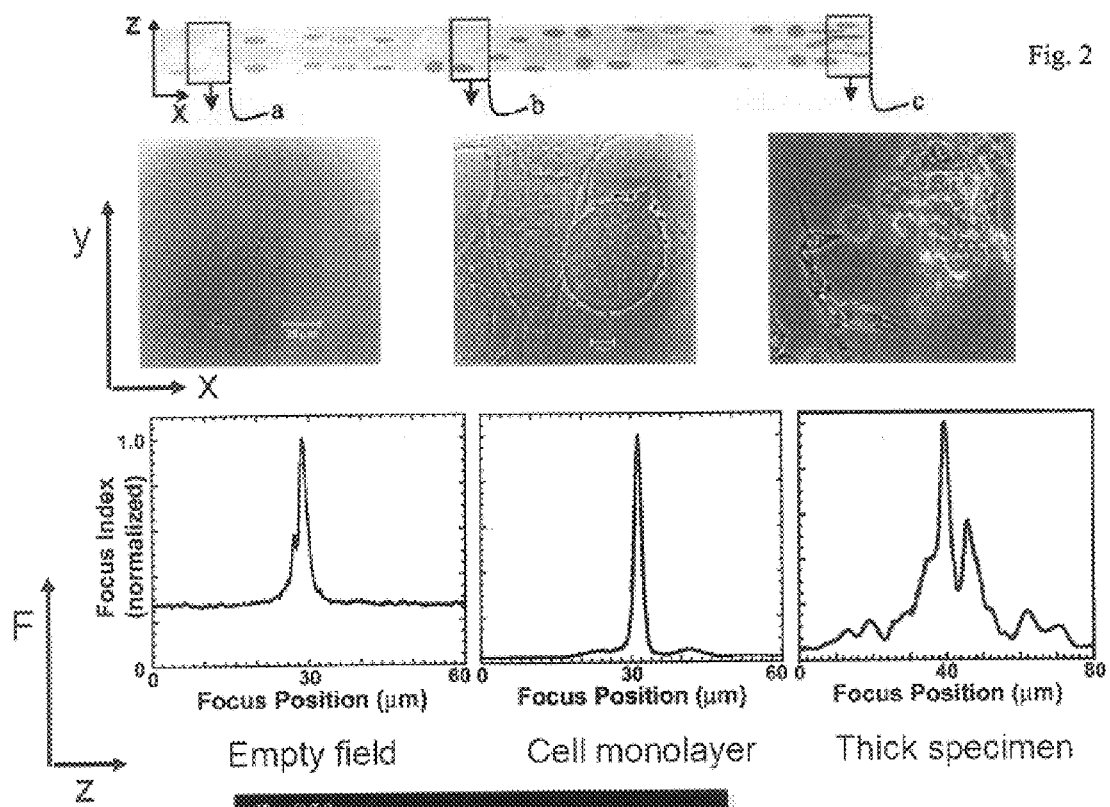
Fig. 2
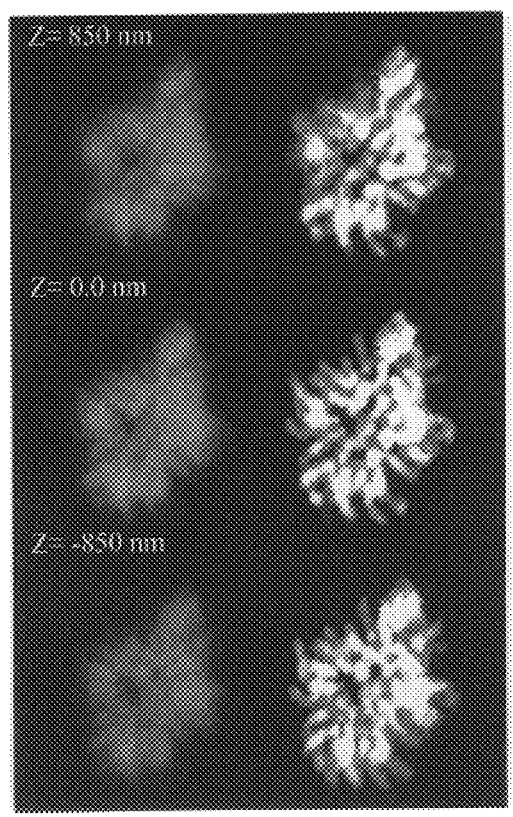 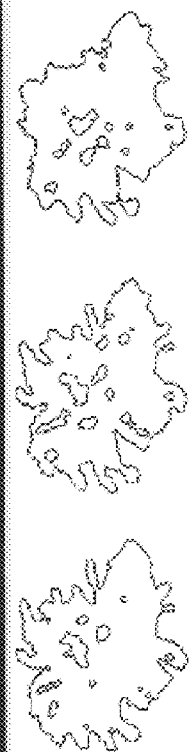
Fig. 3

AUTOMATIC ON-THE-FLY FOCUSING FOR CONTINUOUS IMAGE ACQUISITION IN HIGH-RESOLUTION MICROSCOPY

BACKGROUND OF THE INVENTION

The present invention relates to microscopic imaging, and more particularly, to simultaneous image scanning at a variety of focal depths for improved automatic focusing during continuous imaging of a microscopic specimen. The invention is advantageous for rapid scanning of an entire microscope slide at high image resolution.

The performance of a scanning cytometry system based on optical microscopy depends both on the scanning instrumentation's characteristics and on the specimen's characteristics. The instrumentation performance criteria include: lateral resolution, depth of field, focus range, focus accuracy, focus frequency response, slide scanning rate, photometric sensitivity and dynamic range. Important specimen characteristics include tissue thickness and slide flatness in relationship to the instrument's objective numeric aperture (NA). Biological specimens do not lie in a single focal plane across a microscope slide which complicates automated scanning of the specimen for image cytometry using typically narrow depth-of-field microscope optics.

Adapting existing scanning systems to optical microscopy often results in a compromise between scanning speed and image resolution. For example, web inspection systems with time-delay-and-integrate (TDI) sensors are used in automated high speed visual inspection systems to detect and identify defects on continuously moving objects. The object in the field of view of the sensor is assumed to be flat and a 2D image is formed by synchronizing the line frequency of the camera to the web movement. When the web or conveyor is not flat, image quality can be degraded. Therefore, the depth of field is usually made large and carefully adjusted to include the largest variations in axial position. In these applications resolution is not a limiting factor and can be sacrificed to obtain large depths of field and avoid the need for an autofocus system. When web inspection techniques are applied to optical microscopy, as in the macroscopic implementations, large depths of field were ensured by the use of low NA objectives in order to avoid the need for autofocus. This is appropriate in low resolution imaging over limited areas, but requires depth of fields of on the order of 10 microns ($\mu$m) or more over the length of a standard microscope slide. For higher resolution imaging, the depth of field is limited to about 1.0 $\mu$m and refocusing at each field of view is required to improve image quality.

Another exemplary scanning system is optical profilometry. In optical profilometry, a point source of light is imaged on the specimen. Best focus is determined essentially by minimum point size and a focus error detection system is used to measure surface topography. A number of different methods are used to produce an error signal proportional to height variations from minimum point size and this error signal is used to servo control best focus. The height variations are then recorded as lens positions during scanning. The data show horizontal resolutions of 1 to 0.01 $\mu$m and vertical resolutions of 0.5 to 0.001 $\mu$m. However, the surface slopes of the specimen have a significant influence on the measurement accuracy. One Profilometer follows the specimen surface very well at repositioning frequency of 100 hertz (Hz) with specimen height variations up to 0.2 $\mu$m. In open loop mode, the objective lens is fixed and the surface height is derived directly from the focus error. Open loop mode increases the measurement frequency, but a servo is required when the axial range is large such as with biological specimens. Since data is gathered one point at a time, this method is slow and apparently has not been applied to semitransparent specimens (like tissues) that can reflect from multiple surfaces.

Accordingly, there exists a definite need for an automatic microscopic scanning system that can rapidly scan, at high resolution, an entire microscope slide containing a biological specimen. The present invention satisfies these needs and provides further related advantages.

SUMMARY OF THE INVENTION

The present invention is embodied in an imaging apparatus, and related method, for fully automatic, high-speed, high-resolution image cytometry. The imaging apparatus updates the focus many times across a conventional microscope field of view while moving the stage in a continuous motion at a constant velocity. The improved focus accuracy and allows performance of high resolution scanning image cytometry at high speeds and analysis of an entire microscope slide in several minutes.

Other features and advantages of the present invention should become apparent from the following description of the preferred embodiments, taken in conjunction with the accompanying drawings, which illustrate, by way of example, the principles of the invention.

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

FIG. 3 shows images of a cell's original flourencence image, processed image, and contour image at optimum focus, at positive defocusing and at negative defocusing.

DETAILED DESCRIPTION OF THE PREFERRED EMBODIMENTS

Figure 1:
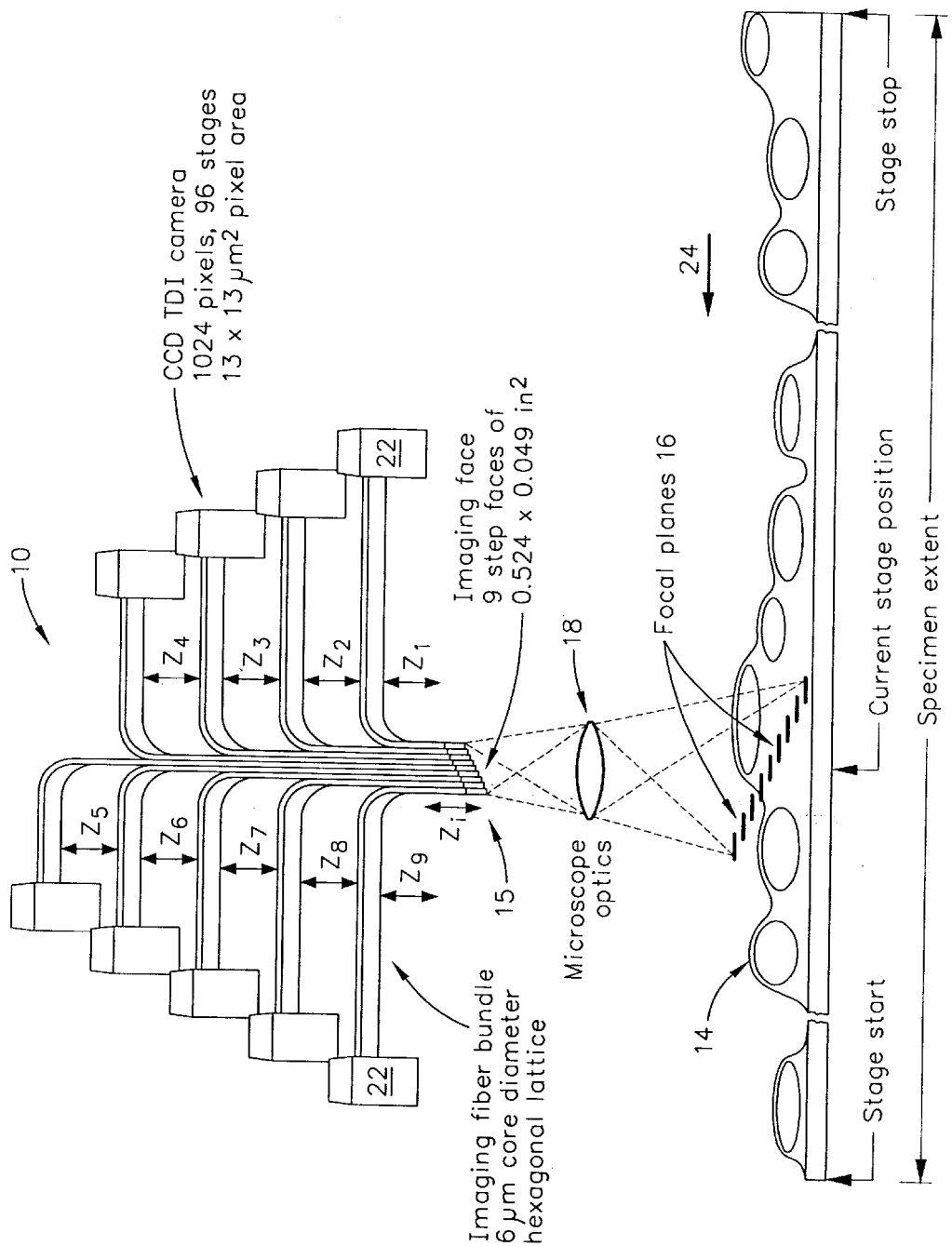
FIG. 1 is a schematic diagram of a volume imaging apparatus for continuous imaging of a specimen using imaging faces having adjustable focal depths, according to the invention.

The present invention provides apparatus, and related method, for an on-the-fly autofocus system for high-resolution image cytometry which keeps the image sharply focused during continuous stage travel. A volume camera 10 of the invention acquires an image volume is by concurrent optical sectioning of the specimen 12 with a dedicated imaging array 14 as shown in FIG. 1. Imaging array has multiple predetermined imaging faces 15 having adjustable optical path lengths to the focal planes 16 allowing simple adaptation to objectives 18 with different depths-of-field and magnifications. Automatically tracking focus with high precision over an area the size of a microscope slide is particularly advantageous because even a slide having a thin, densely populated cell monolayer are imperfect in thickness.

The autofocus technique performs sharpness measurements on images acquired at a sequence of foci in parallel in order to extend autofocus to continuous scanning. The sequence of foci at which images are collected for sharpness measurements represent optical planes in a magnified 3D specimen space. Normally, a 3D image is collected by sequentially moving the stage axially a small amount between planes in the stack of 2D images. However, it is also true that the magnified image of the specimen (i.e., the region near the image sensor) is a 3D representation of the specimen space. Image quality can degrade if the sensor is placed too far from the nominal focus in this 3D space. For a Nikon 20×0.75 NA Fluor objective (160 mm tube length), however, experimental MTF measurements have demonstrated no change in cutoff frequency over a range that altered the front focus of the objective (i.e., the focus in the specimen) by ±50 $\mu$m. Thus, multiple sensors 22 can be placed at different axial positions ($z_1-z_o$) in the image space over quite a large range without reducing optical quality. These sensors can then concurrently acquire the optical sections that make up a volume image. The design of a dedicated imaging array (the volume camera) is presented along with a model for tracking focus during continuous scanning.

The volume camera 10 is created by placing image sensors at different foci as shown in FIG. 1. In this configuration, the sensors may also be displaced laterally. When this adjacent placement is used, image (or focus index) registration is achieved through buffering.

Since axial magnification is approximately equal to the square of the lateral magnification, subresolution axial sampling of the specimen space 14 is achieved easily. This configuration allows acquisition of axially displaced optical planes that lie near the normal detector position without degradation in optical performance. The axially displaced detectors are line array sensors synchronized to the stage velocity 24. We used EG&G (Sunnyvale, Calif.) TD 1096 which are 1024 pixel×96 line TDI CCD arrays with a 13×13 $\mu$m pixels. TDI cameras integrate in proportion to the number of lines to increase signal-to-noise and sensitivity. The system was also designed to allow axial adjustment of the TDI sensors to obtain optimal axial sampling for objectives with different depths-of-field and magnifications.

The computational demand of calculating and adjusting focus dynamically is absorbed by an array of parallel autofocus circuits that measure the 3D image in real time.

A volume imaging apparatus having autofocus capabilities is disclosed in U.S. Pat. No. (PCT Application No: WO 96/01438 published Jan. 18, 1996) titled AUTOFOCUS SYSTEM FOR SCANNING MICROSCOPY. The image processing and autofocus systems disclosed in the W0/091438 application may be applied to the present invention.

Figures 1, 11:
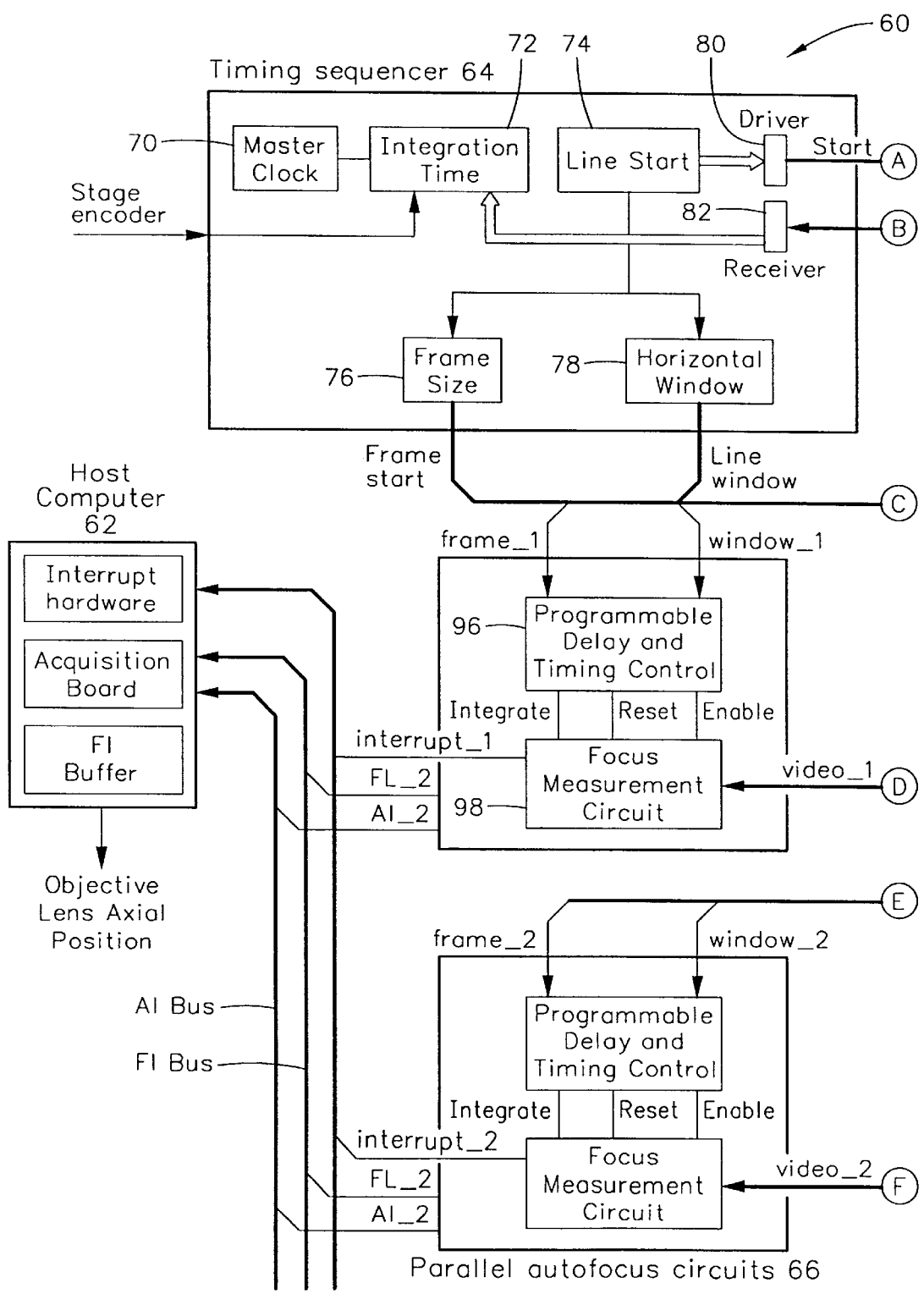
FIG. 11 is a block diagram of a host computer, a timing sequence, remote sensors, and parallel autofocus circuits for focusing and generating and processing the volume image obtained from the volume imaging apparatus of the invention.
Figures 2, 11:
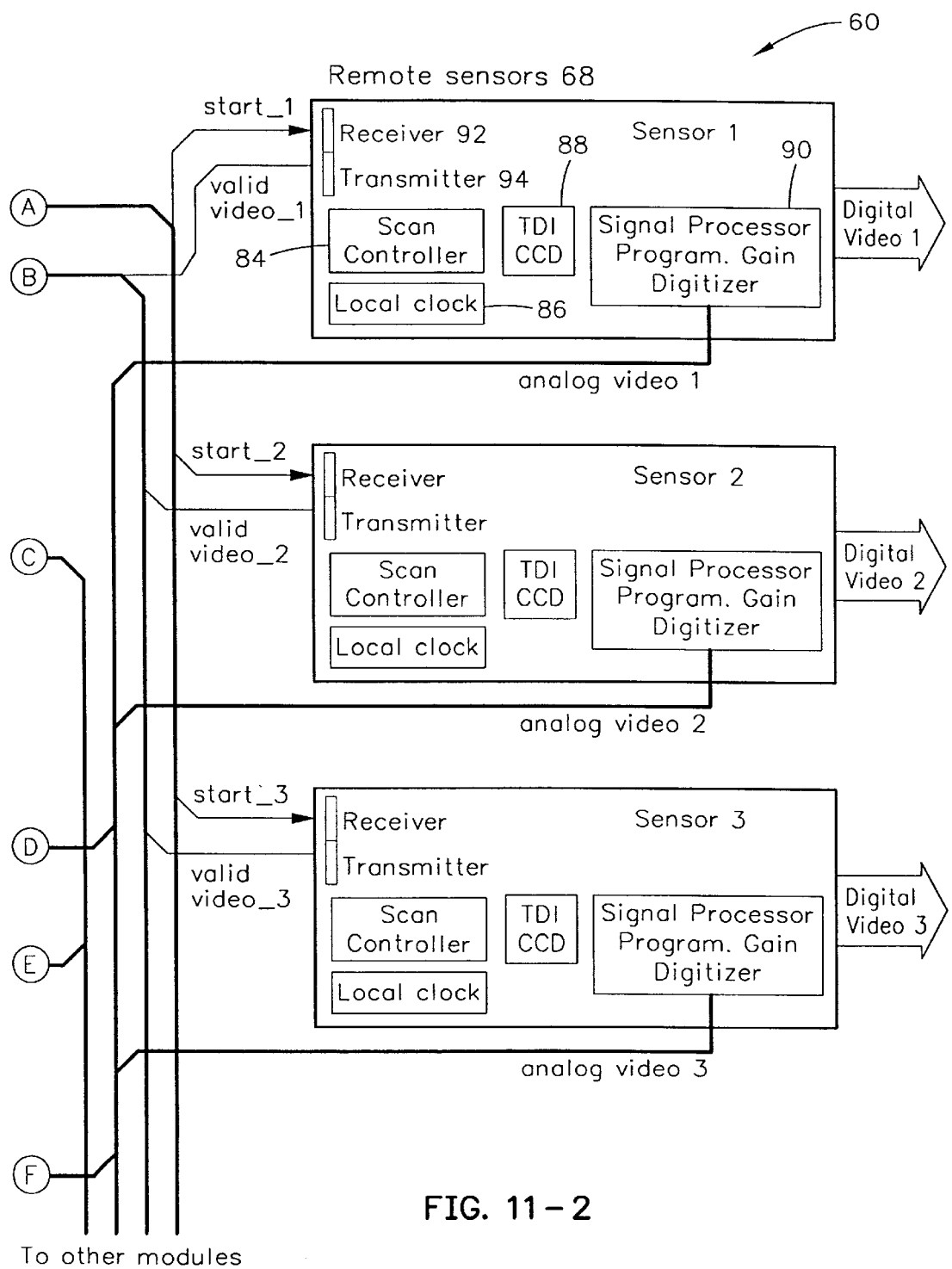
FIG. 2 shows, a slideimaged at three locations, of differing cell distributions, with adjacent images and graphs of focus index versus vertical position.

With reference to FIG. 2, the first slide location (a) shows the effect of a low signal when cells are absent. The second slide location (b) shows the image and focus index obtained with a cell monolayer. The third slide location (c) shows overlapping cells. The typical problems encountered in image cytometry correspond to differences in cell density across a slide. FIG. 2(b) represents the optimal densely populated cell monolayer and FIGS. 2(a) and 2(c) represent the opposite extremes of an area with no cells and one with many overlapping cells in a multilayer. The focus function curve of a low signal field (FIG. 2(a)) is marked by a spurious maximum, a sharp sidelobe, and noisy background. The cell multilayer (FIG. 2(c)) shows that the system might become confused by the multimodal focus response and track a sidelobe rather than the main best average focus peak. A system designed for high speed tracking of focus over a large area must work robustly even when there are too few or too many cells.

When performing automated cell scanning at high lateral resolutions, features such as cell pattern and texture can be important for cell classification, but the discriminatory power of these features is highly dependent on focus. For accurate measurements from microscope images, high numerical aperture (NA) is preferred in order to obtain good lateral resolution. However, the depth of field is inversely proportional to the square of the NA and sharp focus becomes critical even at moderate NAs ($\geq 0.5$). With narrower depths-of-field, biological specimens do not lie in a single focal plane across the slide and automated scanning for image cytometry must be accomplished by autofocus. Because higher resolutions also dramatically increase the amount of image data, the autofocus must be combined with rapid scanning.

The influence of focus in feature extraction is demonstrated by three different images of the same object at different foci (a–c) in FIG. 3. The first image (a) was taken with the focus set to a position before the optimum focus position. The second image (b) was taken with the focus set to the optimum focus position. The third image (c) was taken with the focus set to a position after the optimum focus position. The differences in foci are less than the depth of field of the objective. Each of the original digital images had the same post image-acquisition processing but the corresponding edge maps are different. There are also differences in internal pattern and these differences could cause cell classification errors, decrease repeatability, and increase subsequent diagnostic error. Additional processing can be applied to recover defocused images, but these complex iterative algorithms are also slow and often cannot deblur without some error. Real-time autofocus that maintains image sharpness precisely, therefore, is advantageous over algorithmic correction techniques.

Figures 4, 5A, 5B, 5C, 5D, 5E:
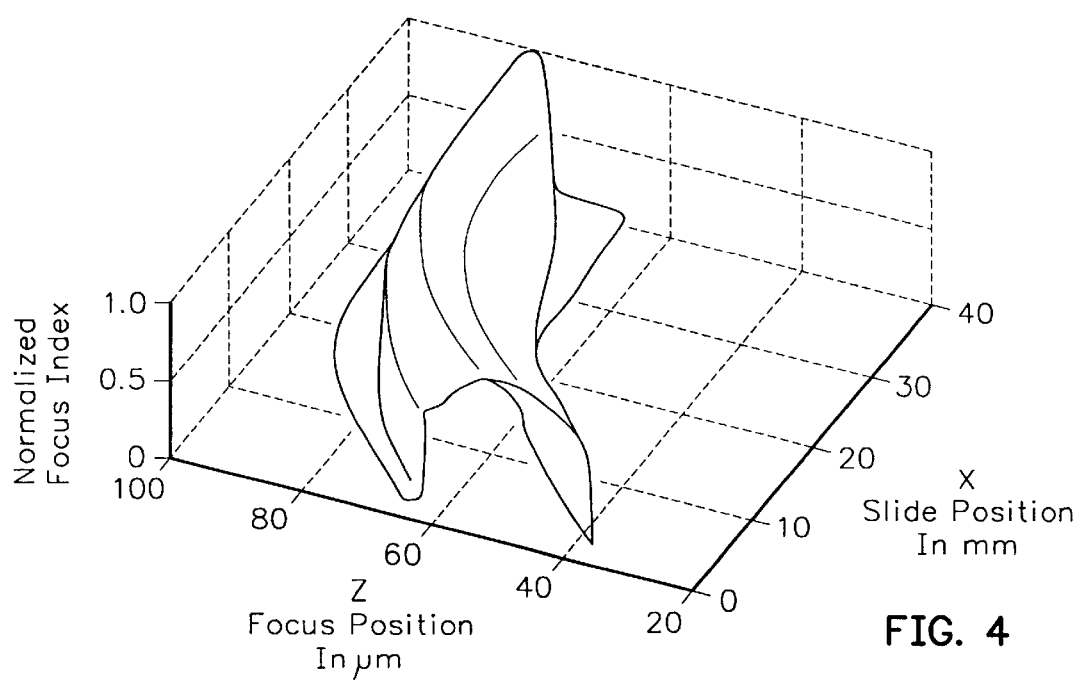
FIG. 4 is a three-dimensional plot of focus function curves for a single one-direction scan.
FIGS. 5A–5E are schematic diagrams representing a variety of predetermined spacings for the imaging faces, according to the present invention.
Figure 6:
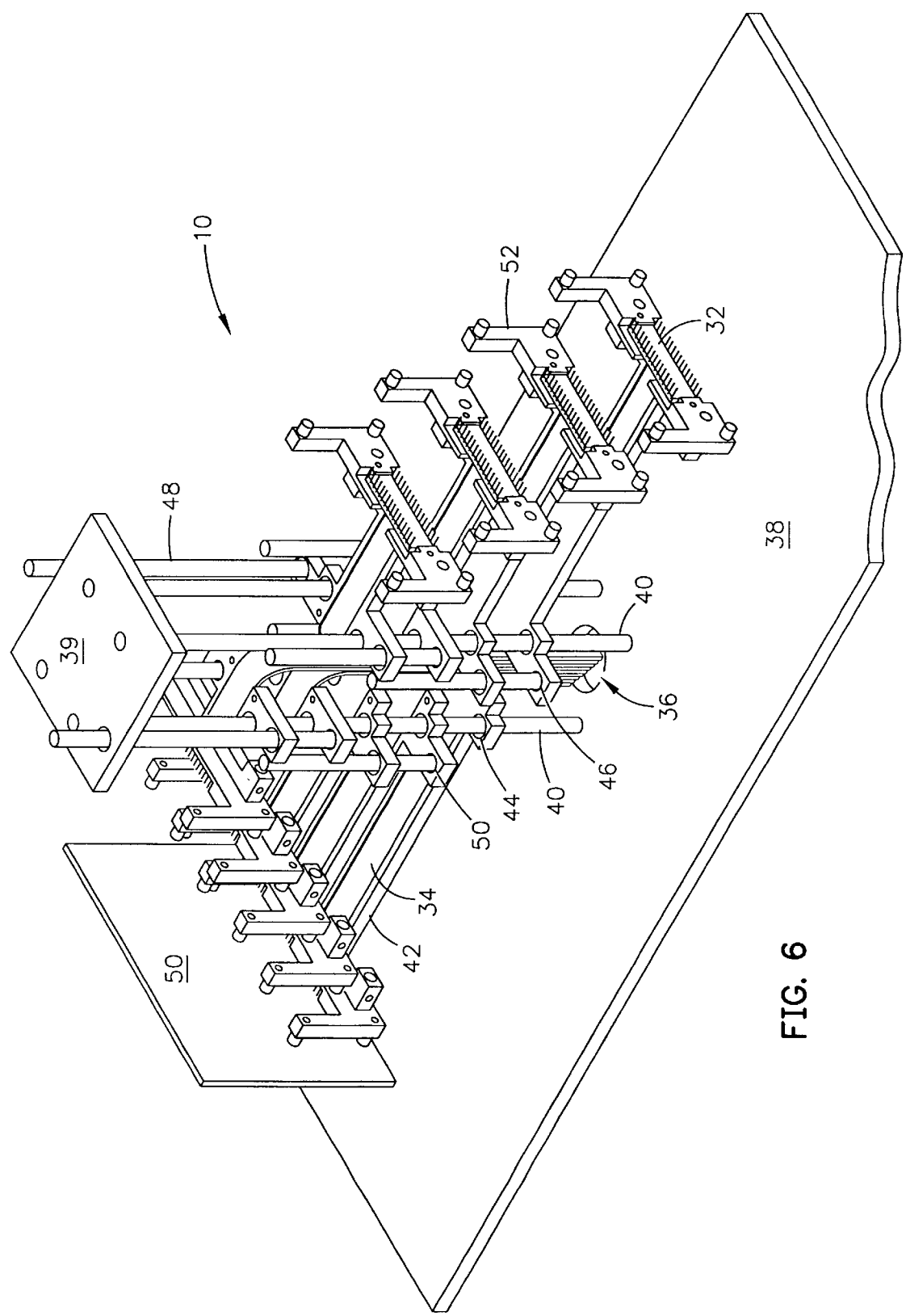
FIG. 6 is a perspective view of an embodiment of a volume imaging apparatus for continuous imaging of a specimen using imaging faces having adjustable focal depths, according to the invention.
Figure 7:
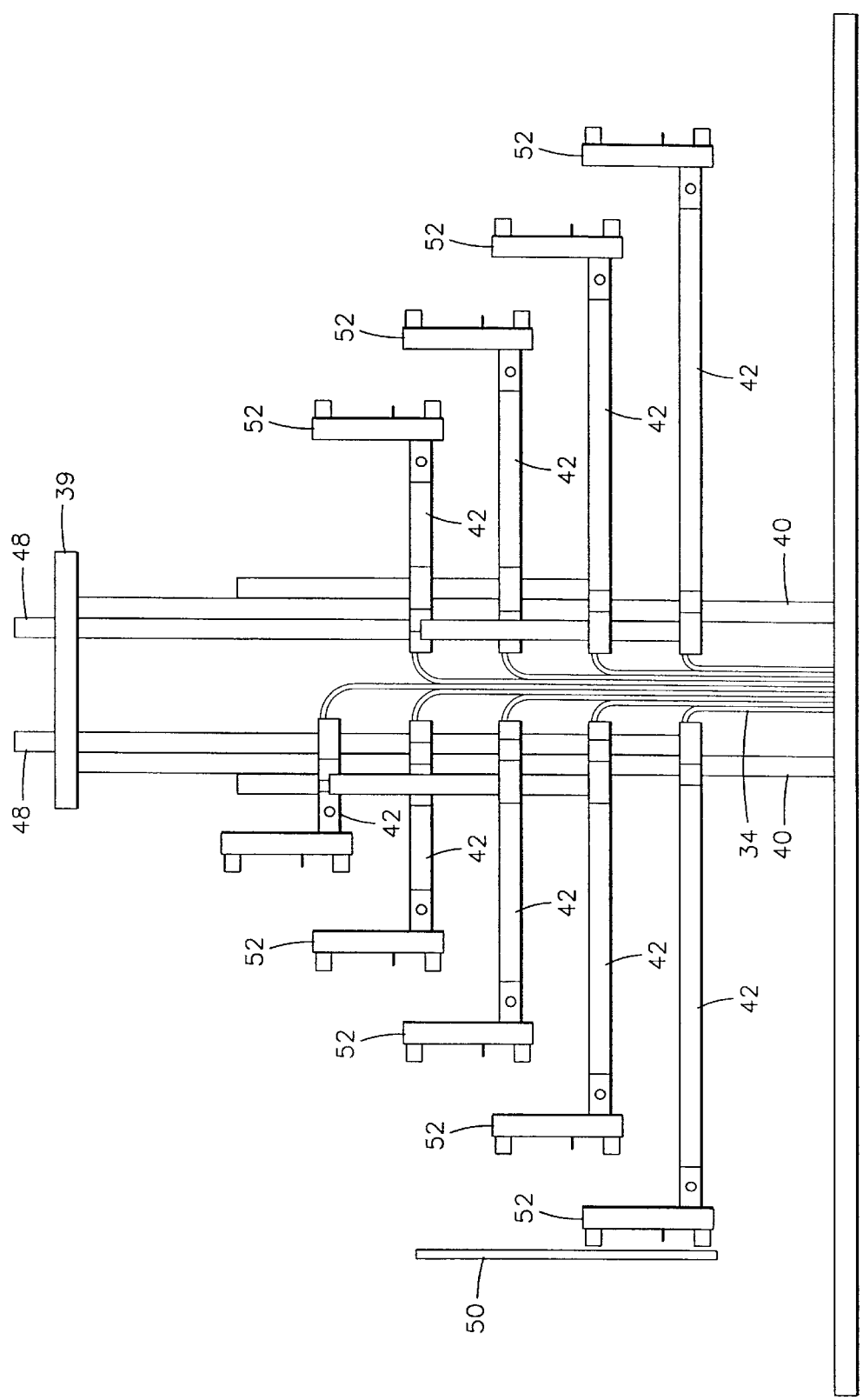
FIG. 7 is an elevation view of the volume imaging apparatus of FIG. 6.
Figure 8:
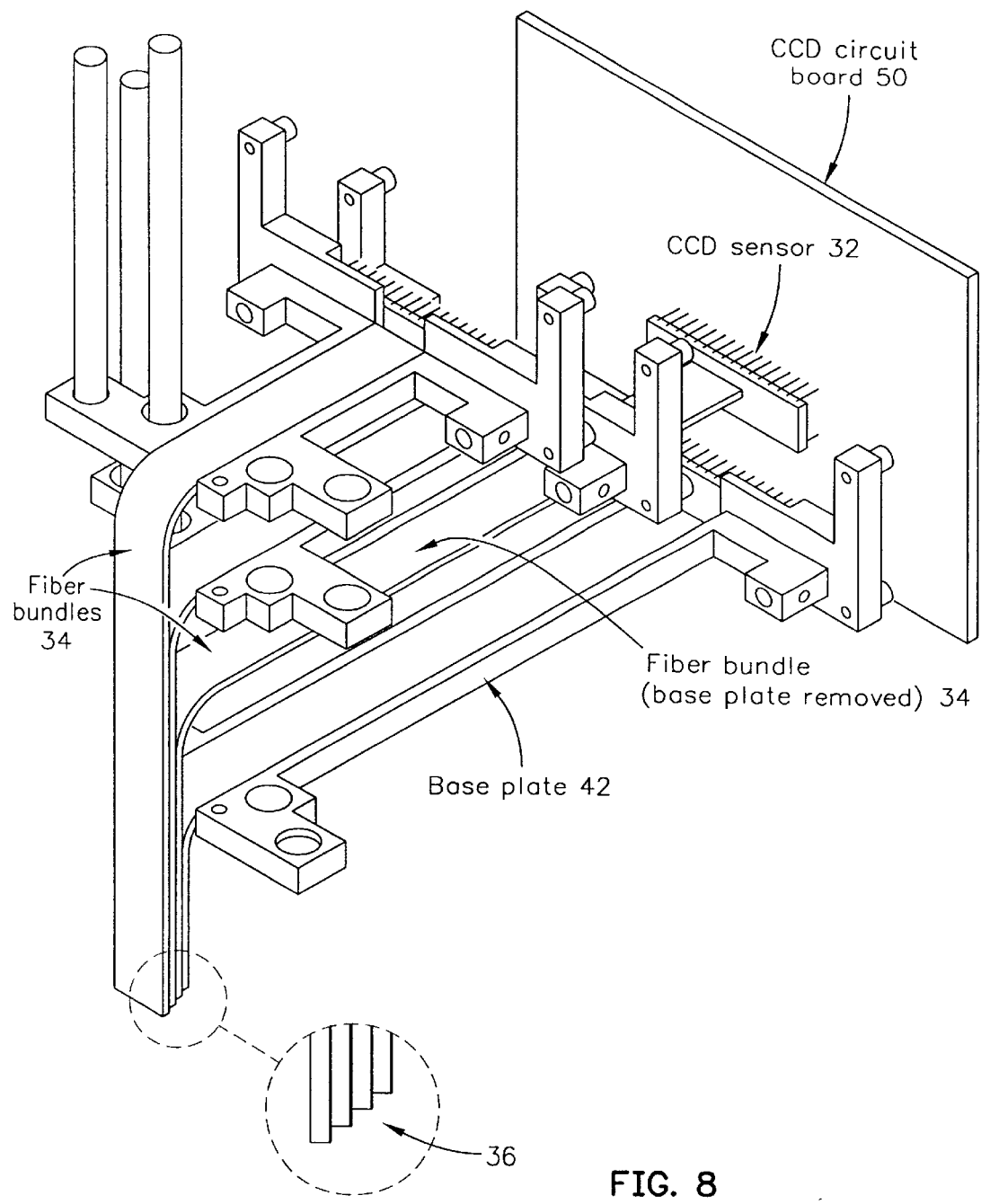
FIG. 8 is a perspective view of a half portion of the volume imaging apparatus of FIG. 6, showing the mechanical structure for supporting coherent fiber bundles that couple images from the imaging faces to a CCD sensor and circuit board.
Figure 9:
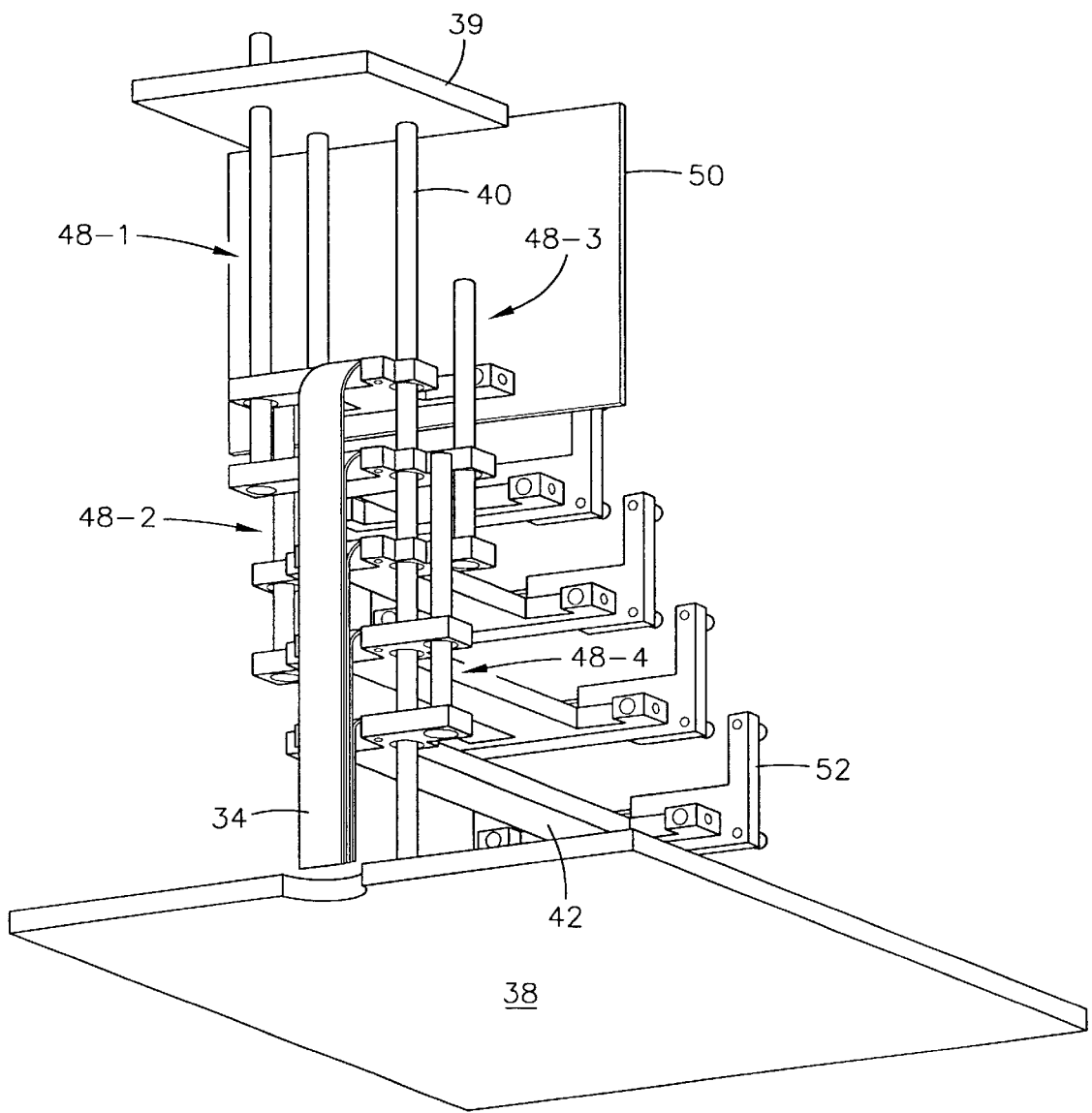
FIG. 9 is a perspective view of a half portion of the volume imaging apparatus of FIG. 6, showing the mechanical structure for adjusting the relative focal depths of the imaging faces, according to the invention.
Figure 10:
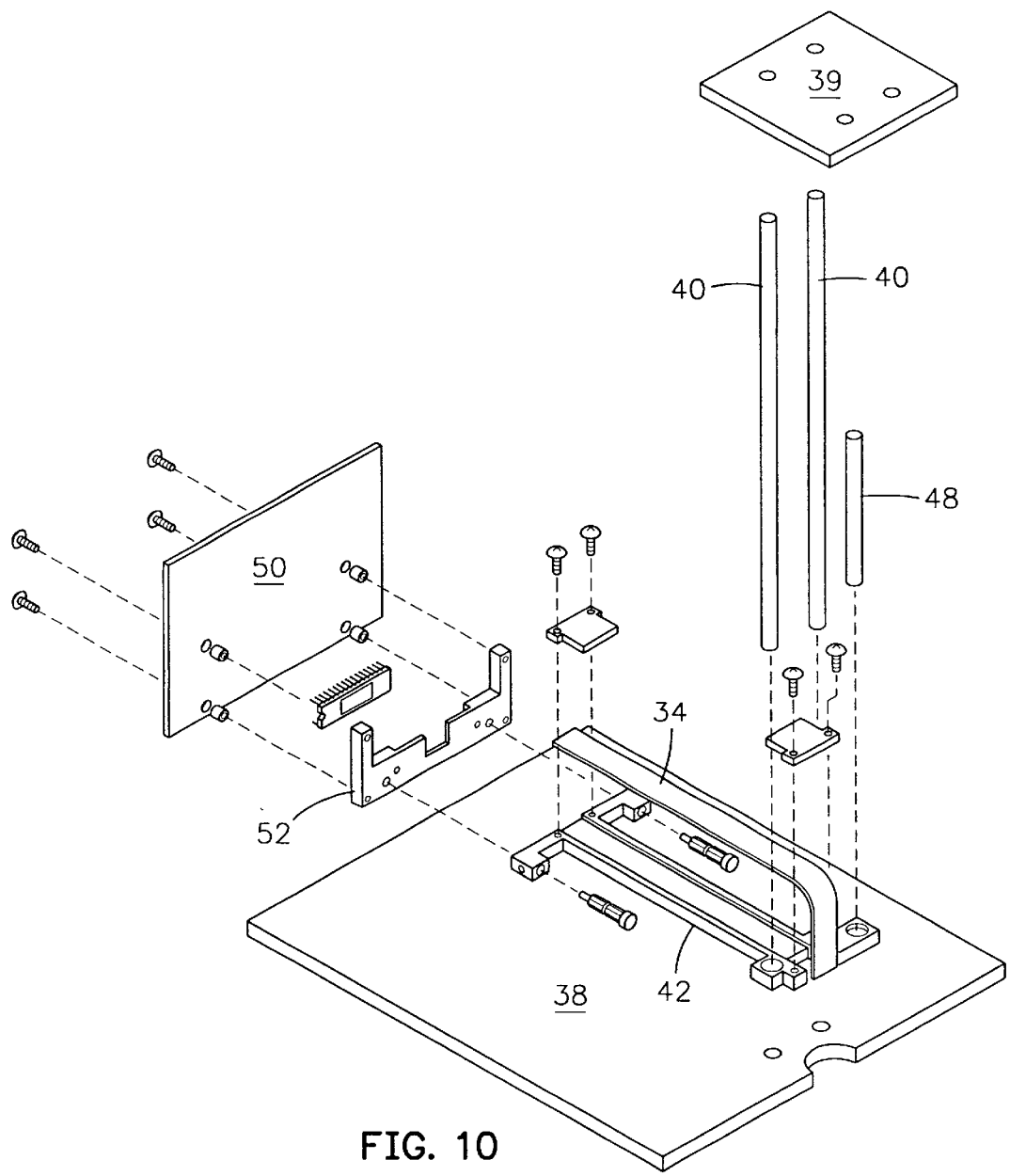
FIG. 10 is an exploded perspective view of a half portion of the volume imaging apparatus of FIG. 6, showing the mechanical structure for supporting one of the coherent fiber bundles and for adjusting the relative focal depth of the corresponding image face, according to the invention.

As shown in FIG. 4, the focus curve will follow the curvature of the specimen features as the slide is scanned. The horizontal sample size is 650 nm and the focus measurement area is 312 $\mu$m (V)×325 $\mu$m(H) with a 20×0.75 NA phase contrast objective. 85 focus positions form a single focus function curve for each slide position.

The focal planes 30 can be configured in a wide variety of predetermined relatives spacings. For example, as shown in FIG. 5A, the planes are configured in a staggered arrow configuration. Further, as shown in FIG. 5B, the planes can be in a curved configuration with the planes at one end of the imaging planes being more widely spaced in focal depth than the plane at the other end. Alternatively the imaging planes may be more widely spaced at the ends and more closely spaced in the middle, as shown in FIG. 5C. Likewise, the imaging planes may be configured in a V- or an inverted V-shape, as shown in FIG. 5D. As shown in FIG. 5E, another configuration for the focal planes is a W shape.

One embodiment of a volume imaging apparatus 10 or camera of the invention is described with reference to FIGS. 6–10. In this embodiment, images from adjacent imaging planes are transferred to separate detectors 32 by coherent fiberoptic bundles 34 having image faces 36 that are placed at predetermined image plane locations. The mechanical structure of the volume camera allows for relative axial adjustment of each of the image faces. The volume camera has a bottom plate 38 that is mechanically coupled to a top plate 39 by four-rigid support rods 40 that are fixed to the top and bottom plate roughly in the center of the area between the four rigid support rods. The top and bottom plates are shown cutout from a rigid support box that holds them fixed in space.

The present embodiment of the invention has nine fiberoptic bundles, corresponding support structures and imaging sensors. The nine bundles allow placement of the image faces over a 2 $\mu$m range in 0.25 $\mu$m increments. More or fewer fiber bundles may be used and smaller or larger axial steps between the image faces may be used in accordance with the invention.

Each coherent fiberoptic bundle is supported by a base plate 42. The base plate has closely fitting holes 44 that allow the base plate to slide along two of the rigid support rods. (FIG. 10) Each base plate also has a threaded hole 46 for receiving an adjustment screw 48-1 to 48-4. Each adjustment screw 48-1 to -4 has 80 turns per inch for making micrometer adjustments to the base plate position. All of the base plates, except the base plate adjacent to the top plate, also have a bearing hole 50 for receiving the end of one of the adjustment screws 48-1. The top plate includes a bearing hole and additional adjustment out for receiving the adjustment screw for adjusting the location of the top base plate with respect to the top plate. The remaining adjustment screws 48-2 to -4 are configured between base plates to allow adjustment to a variety of predetermined face plate configurations.

Each adjustment screw may be driven manually or automatically by a motor controller as discussed below with respect to FIG. 13. Generally, the selected imaging 36 face configuration will correspond to a particular objective type and specimen 14 under examination.

The camera 10 includes CCD sensors 32 that are coupled to the imaging plane fiberoptically by bonding the imaging fiber bundles 34 (IFB) directly to the CCD devices. The fiber bundles translate the image plane to the surface of the CCD. Each CCD sensor is coupled to a circuit board 50 that is attached to the corresponding base plate by a mounting bracket 52. The objective 18 lens projects the image of the specimen onto the entrance face of each IFB, and the bundle transmits the intensity distribution of this image to the other end face and onto the sensor. The branching shape of the array was devised with IFBs of the same length so that image transmission properties are the same. The bend in the fiber is set to allow the cameras to fit and slide axially in a small camera package.

Axial sampling can be controlled by shifting the input fiber faces axially, and the lateral separation of the fiber bundles 34 produces delays between the acquisition of each field of view. The series of fiber bundles faces 36 can be shifted to create a pattern at the imaging face (e.g. with a linear or 'v'-shaped staircase) to sample the image volume.

Figure 12:
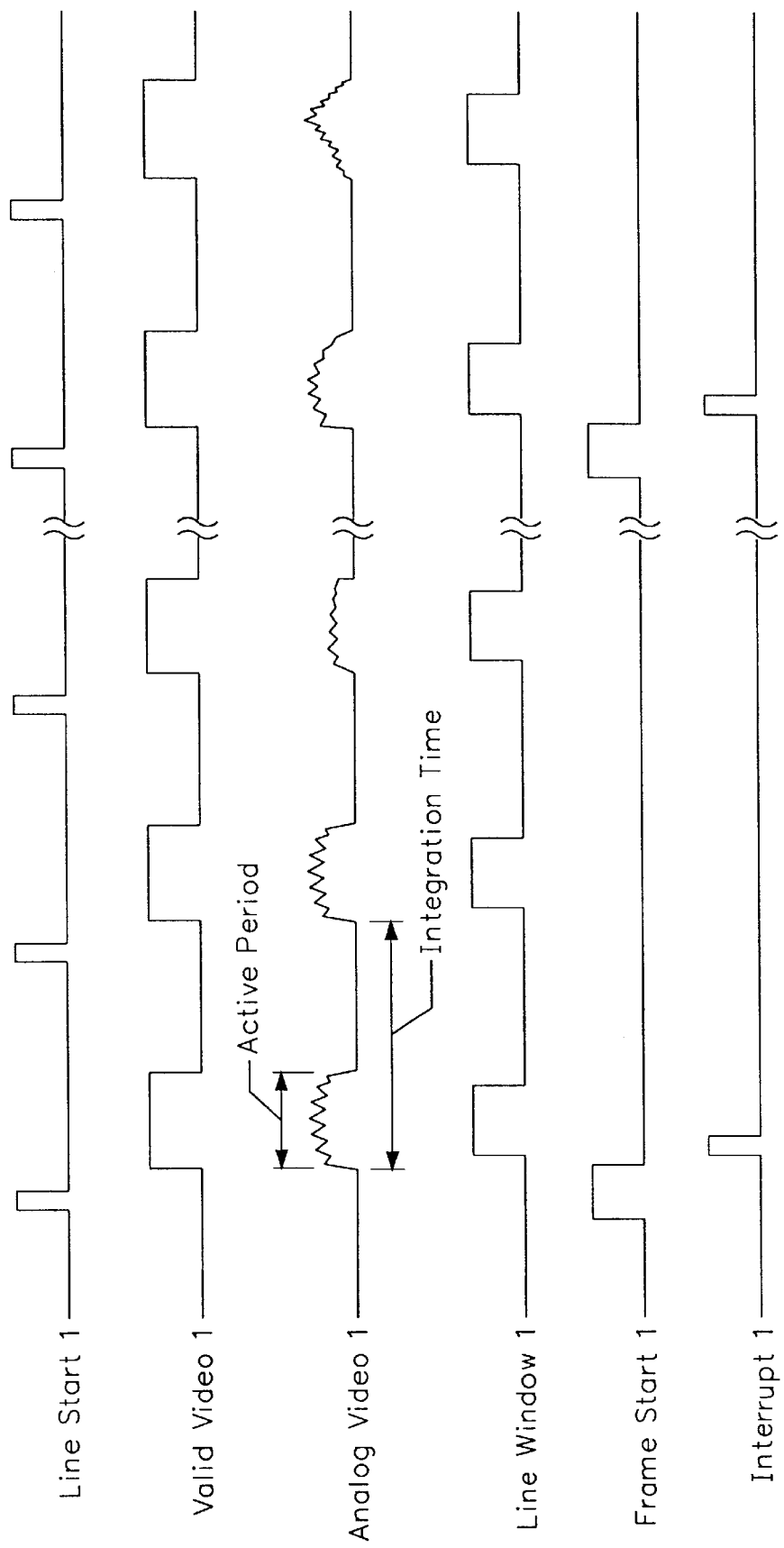
FIG. 12 is a timing diagram showing signal between the timing sequencer, the remote sensors, the autofocus circuits and the host computer of FIG. 11.

The system for implementing the autofocus adjustments and for processing the images received by the sensors 22 are described with respect to FIGS. 11 and 12.

A more detailed description of the image processing methods and the autofocus methods is described in U.S. Pat. No. 5,790,710 and in U.S. Pat. No. (PCT Application No. WO 96/01438).

The processing and control system 60 includes a host computer 62, a timing sequencer 64, parallel autofocus circuits 60 and the remote sensors 68.

The timing sequencer controls the video acquisition and the focus measurement by triggering the remote CCD sensors and setting the size of a focus measurement virtual frame interval. A virtual frame is made of a number of lines to include in the focus measurement and the length of a window in each horizontal line. These values, number of lines and horizontal window duration, are programmable. A horizontal line is made of an active portion and a blank region. The total length of this line is the integration time and is programmable. During the integration period the CCD sensor elements collects light from the projected image. The integration time value is a tradeoff between the speed and the specimen illumination conditions. The sections in the timing sequencer include:
 a) Master Clock 70: Reference clock used to generate all logic timing signals
 b) Integration time 72: Times duration of a video line
 c) Line start 74: Pulse at the beginning of a new video line
 d) Frame size 76: Pulse at the end of a programmable number of lines
 e) Horizontal window 78: Signal part of the active video for focus measurement. Helps eliminates transients produced in the filters of the focus measurement circuit
 f) Driver 80, receiver 82: Used to send or receive the high-speed logic signal over/from large distances.

The remote sensors 68 generate the video signal of the volume camera. The sections of the remote sensors include:

a) Scan controller 84: Uses the local clock, or an external one, to generate the clock phases required by the CCD sensor. Also, signals to the exterior when the active portion of the video is occurring.

b) Local clock 86: Reference clock of the CCD.

c) TDI CCD 88: Sensor that converts the light to charge d) Signal processor 90: programmable gain, and digitizer; process the output of the CCD create a direct high performance digital volume image that can be acquired and viewed independently. It also creates the analog video signal that is used by the focus measurement circuits.

e) Receiver 92 and transmitter 94: Receive or send the high-speed logic signal from/over large distances.

The parallel autofocus circuits 66 perform the continuous focus measurement on several video inputs by using an array of autofocus circuits in parallel. Each autofocus circuit requires two logic signals from the timing sequencer 64: frame and window. The frame signals when to start a focus measurement interval and when to provide the recent measurement values to the host computer. The line window is a pulse that allows the focus measurement circuit to consider the video input for calculation. This pulse duration is valid during a portion of the active video. The sections of the autofocus circuits include:

a) Programmable delay and timing control 96: Delay the measurement and generate the control signals that the focus measurement circuit requires: Integrate, reset, and enable. Also provides an interrupt signal to the host computer 62 when a new focus calculation is ready.

b) Focus measurement circuit 98: Produces two output voltages that correspond to the focus index and the average illumination of the virtual video frame measured.

The logic control signal groups start, frame_start line_window and valid_video, are grouped in terms of its function and individual signals can be active independent of the other signals in the same group. The timing generator activates these so that camera boards can be started at different times if desired, and the focus measurement is synchronized to its corresponding remote sensor. An initial goal is to measure focus at the same spatial region (field of view), even though, the sensor may be displaced laterally and a buffer of the measured values is necessary to compensate for this delay.

FIG. 12 shows a timing diagram of the signals between the timing sequencer 64, the remote sensors 68, the autofocus circuits 66, and the host computer 62. After the Interrupt_1 pulse appears, the host computer reads the focus index FI_1 and the average illumination AI_1 values from the autofocus circuit 1. The same timing is valid for the other channels but they may appear asynchronously. Digital autogain signals may also be provided as shown in U.S. patent application Ser. No. 08/796,196.

Much of the computational demand of calculating focus dynamically is absorbed by an array of parallel autofocus circuits 66 that measure the focus indices of each plane of the 3D image in real time. The block diagram of autofocus system is shown in FIG. 11. This system contains the CCD and autofocus electronics. The output of this system (the focus indices) are read by the computer 62 which in turn adjusts the focus with a piezoelectric objective positioner (Polytec PI, Costa Mesa, Calif.). A high performance, low cost analog circuit that measures the focus index and the average illumination in real time has been modified for TDI line scan video and replicated for each CCD sensor in the multiplanar array. A timing sequencer 64 works as the central controller of the parallel autofocus circuits 66 and the cameras 68 of the array, synchronizing focus measurement and image acquisition. The TDI signal consists of video for each line punctuated by horizontal blanks between lines. A line counter provides focus index timing previously provided by the vertical blanks of a video signal. The sequencer 64, which sets the integration time of the CCDs, also contains a programmable line counter that creates a virtual frame to provide the focus index integration interval. The continuous focus measurement circuit 98 resets at the end of each virtual frame interval and generates an interrupt to the host computer 62 for A/D conversion, calculation of best focus, and piezoelectric refocusing.

With much of the autofocus computational burden born by the parallel autofocus circuits 66, the computer 62 can be programmed to execute almost any autofocus algorithm. The algorithm can preferentially weight present values of focus over past values and utilize predictors for upcoming focus indices. This is different from a conventional negative feedback loop. Because calculation of best focus from sharpness measurements (or focus indices) does not require an iterative algorithm for comparison at successive trial positions, it can be carried out in real-time for rapid focus adjustment.

These rapid computational methods make the 10 ms response of the piezoelectric objective positioner the slowest component in the focus measurement and update sequence. The volume camera and continuous autofocus system will calculate and update the focus position at a rate of 100–1000 Hz during scanning. With a relatively flat specimen, the scanning speed ultimately may be limited by the video rate of the TDI cameras. With a programmable number of video lines in the virtual frame (focus measurement window) the combination of focus positioning response and the focus index signal-to-noise ratio will determine the actual focus update frequency and the ultimate focus accuracy.

Experience with incremental scanning has shown that focus tracking can be lost when the focus test range is too narrow or a field is completely empty. As the virtual video frame is made smaller (a sub-region of the microscope FOV), local details (e.g., cells as well as surface irregularities) can increase axial variations and accentuate gradients so as to demand faster focus positioning response during continuous stage movement. Conversely, with larger virtual video frames, areas of high slope are averaged and spatial gradients diminish in proportion to the number of video lines in the virtual frame. The parameters of the test range can be determined for each specimen and objective lens completely, but void fields (with no image content for focus measurement) could still pose substantial problems. Recent experiments with the autofocus circuit of the invention, however, has shown that debris much smaller than a single cell is enough for accurate focus tracking. In combination with linear prediction, this high focus measurement sensitivity allows accurate tracking over small areas that lack even small amounts of debris.

In order to set the volume camera parameters to maximize accuracy and tracking stability, the focus function curve (FIGS. (2a–c bottom)) and depth of field may be used to guide in setting the spacing between optical sections. Additional considerations for the spacing include the minimum spacing between optical sections that produces substantial differences in the sharpness measurements, and the range required to cover focus function width. The focus search range may be adapted to fit an appropriate portion of the focus function curve range and variations from specimen flatness. Focus function filter parameters (e.g., bandwidth, central frequency, and attenuation) can also be adjusted to achieve the best focus function response.

The events of a scan with a volume camera consisting of N sensors are:

a) At the end of each virtual frame, an interrupt signals the computer that a new focus measurement has been completed for one of the planes. The outputs of the autofocus circuits can be transmitted to the computer asynchronously and buffered there prior to best focus calculation.

b) All N focus measurements are acquired and buffered for one virtual frame.

c) On each buffered set of data that corresponds to one virtual frame, best focus is calculated. (e.g. using power-weighted average) and the lens positioned to best focus.

The maximum time delay between the measurements corresponding to the same field of view is $$\tau_d = \frac{V_f f_s (N-1)}{M * F_l},$$

where M is the magnification, $f_s$ is the spatial sampling frequency of the microscope-camera system, and $F_l$ is the line rate of the CCD sensor, and $V_f$ is the virtual video frame length given by $$V_f + N_l D,$$

where $N_l$ is the number the lines in a focus measurement window and D is the pixel size.

The lateral displacement of the sensors makes it possible for two or more sensors to sample the same, or nearly the same focal plane, if the slope of the specimen matches the slope sensor array. For this reason and other considerations, it may be that a simple linear staircase is not the best arrangement of the foci for the sensor array.

The framework of a simultaneous multiplanar image acquisition model that combines specimen and the volume camera characteristics has been developed to evaluate strategies for tracking focus. FIG. 4 shows the family of focus function curves for a single scan in one direction over a slide (with monolayers of NIH 3T3 cells). The ridge of this 3D family of curves corresponds to the series of best foci in the scan. The shape of the focus response depends on the optical system settings and the specimen. The number of foci tested for autofocus in our previous experiments varied from 7 to 11, but the curves in FIG. 4 utilized 85 test foci to more accurately delineate the shapes of the focus function curves. These focus indices, collected from incremental scanning, create the virtual test specimen for testing various focus tracking algorithm.

The use of focus functions with points from many optical planes provides an efficient way to simulate any biological specimen by reducing the amount of data required to store long lateral sections through the specimen sample. This specimen model will be useful primarily for focus assessment of the sample under observation. By comparison of the continuous scanning best foci with the incremental best foci, the performance of various algorithms and sensor positions can be measured.

Table 1 presents a matrix of focus measures that correspond to the distribution of optical planes in the volume camera. These focus values and their coordinates (z, x) are used to reconstruct the focus function behavior of the specimen and to calculate best focus position for subsequent focus adjustment.

TABLE 1

Distribution of the volume camera focus measurement planes.

| $F(Z, X_1)$ | $F(Z, X_2)$ | ... | $F(Z, X_n)$ |
|---|---|---|---|
| $F(Z_j, X_1)$ | $F(Z_k, X_2)$ | ... | $F(Z_m, X_n)$ |
| ... | ... | ... | ... |
| $F(Z_2, X_1)$ | $F(Z_2, X_2)$ | ... | $F(Z_2, X_n)$ |
| $F(Z_1, X_1)$ | $F(Z_1, X_2)$ | ... | $F(Z_1, X_n)$ |

Where j, k, and m, which represent the number of axial positions in a specific field of view, do not necessarily correspond to equal spacing. $X_{n+1} > X_n$, but $Z_n$ is not conditioned with respect to $Z_{n-1}$. The F(Z,X) values represent the focus measure of imaging planes at axial position Z and lateral position X in the field of view. X represents the lateral spacing between sensors.

The number of planes, the spacing between them, and the search range required to track focus depend on the thickness of the specimen magnified onto the image volume, the slope of the specimen, and the speed of scanning. Therefore, the application and the specimen will determine the number, spacing, and extent of the optical planes for best tracking performance.

Focus tracking can also be limited by the axial gradient of the specimen and its velocity. In FIG. 4, there is an initial z gradient in the best focus ridge that then flattens out at large x. If this gradient is too large, the system will not track focus at high speed. A second part of the mathematical model considers the lens positioning response during tracking. If the velocity in the direction of stage motion is Vs=dx/dt then it can be expressed in terms of system parameters by $$V_S = \frac{F_l}{f_s}$$

The length of the specimen covered in a focus measurement interval is $$\Delta x = x_{i+1} - x_i = \frac{N_l}{f_s},$$

where $N_l$ is the number of lines in the virtual frame. The specimen gradient, G=dz/dx, must not be so large as to exceed the objective lens positioner response at a given stage velocity. Therefore, in a distance ΔX, the maximum specimen axial shift ΔZ that can be tracked accurately is approximated by combining equations 3 and 4 as $$|\Delta Z| \le \frac{N_l Z_R}{F_l \tau_S}$$

where $Z_R$ is the focus search range and $\tau_s$ is the settling time of the positioner. This last expression is a good approximation independent of possible errors in the best focus algorithm and positioning; that is, with assumption that calculated best focus equals true focus and that the piezoelectric objective positioner is perfectly accurate. Table 2 shows the specimen detail that can be tracked accurately for some typical values. For these calculations more conservative $\tau_s$ of 20 ms was chosen (instead of the specified 10 ms for the piezoelectric positioner) in order to allow for the other possible errors.

TABLE 2

Specimen height and slope to tracked at different magnifications.

| M | $\Delta Z(\mu m)$ | $\Delta X(\mu m)$ | $\Delta Z/\Delta X$ | 1/fs ($\mu m$) |
|---|---|---|---|---|
| 10 X | 10.6 | 41.6 | 0.25 | 1.20 |
| 20 X | 10.6 | 20.8 | 0.51 | 0.650 |
| 40 X | 10.6 | 10.4 | 1.02 | 0.325 |

Assuming typical values of $Z_R = 100 \mu m$, $\tau_s = 20$ ms, $F_1$ LR = 15 KHZ, and FS = 32 lines.

Autofocus accuracy depends on virtual field size and the speed of objective positioning: a large virtual frame reduces the accuracy in tracking the specimen, and slow objective positioner response averages detail in the axial dimension.

Figure 13:
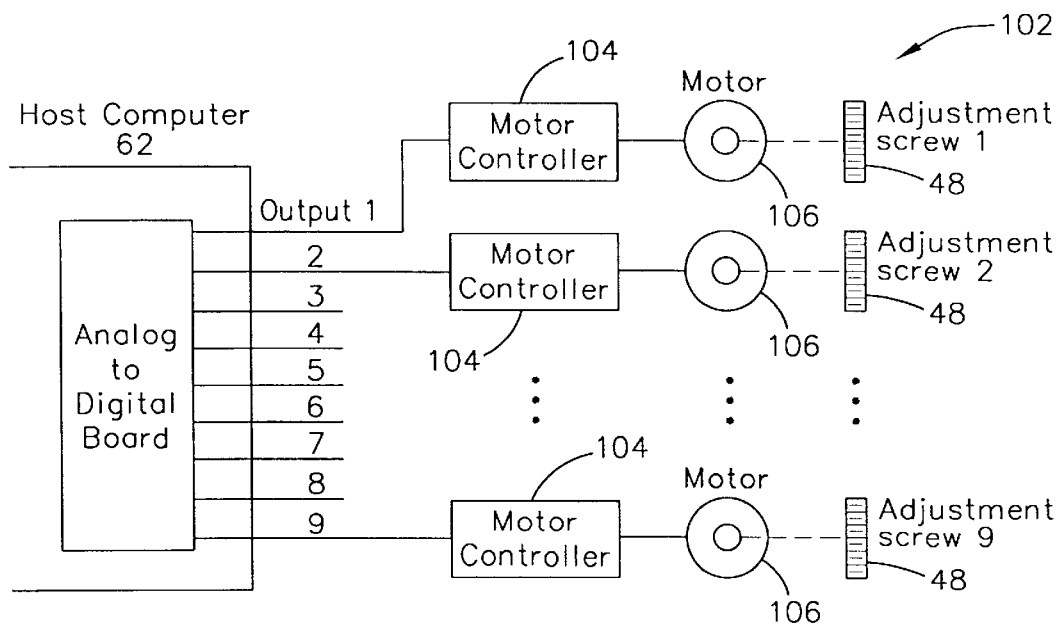
FIG. 13 is a block diagram for an automatic positioning module for controlling axial adjustment screws to position the image faces to predetermined relative positions.

The axial position of the image faces 36 of the fiber bundles 34 may be adjusted by an automatic positioning module 102 shown in FIG. 13. The host computer 62 is coupled to a motor controller 104 associated with each image face and sends signals to the motor controller indicating the desired position for the corresponding image face. The motor controller actuates a motor 106 that is mechanically coupled to the corresponding adjustment screw 48. As shown in FIGS. 6–10, the adjustment screws control the axial position of the image faces of the fiber bundles.

Figure 15:
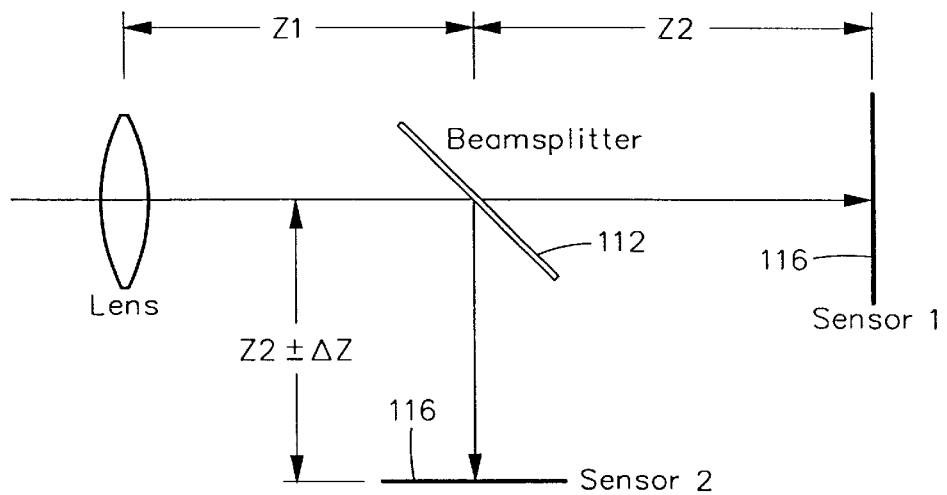
FIG. 15 is a schematic view of a beamsplitter for use in a volume imaging apparatus, according to the invention.
Figure 14:
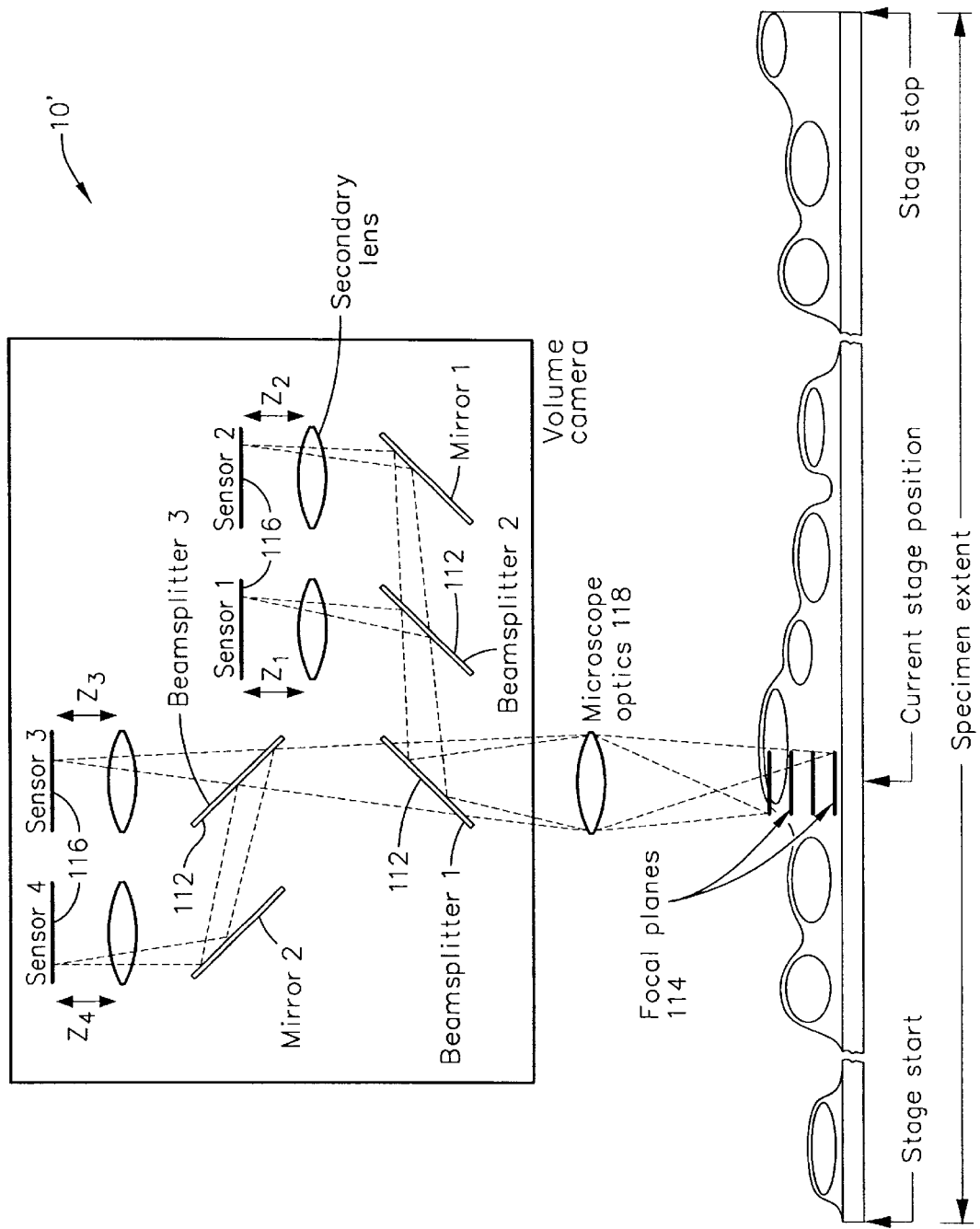
FIG. 14 is a schematic view of an embodiment of a volume imaging apparatus for continuous imaging of a microscopic specimen using beamsplitter for providing images having adjustable focal depths, according to the invention.

FIGS. 14 and 15 shows a volume image apparatus 10', according to the invention, that uses beamsplitters 112 to obtain the multiple planes 114 in the image volume. In this embodiment, the optical path lengths ($z_1$ to $Z_4$) to each sensor 116 are different (by $\Delta Z$) and can be adjusted by moving the sensors themselves. The imaging apparatus has three beamsplitters for generating four image paths. The beamsplitters are 50% splitters with 50% of the light being reflected from the surface of the beamsplitter and with 50% of the light being transmitted through the beamsplitter. The first beamsplitter separates collimated light from the microscope optics 118 into two paths. Each of the two paths are split by a respective beamsplitter generating a total of four paths. Each of the four paths could be further split into eight or more paths in accordance with the invention.

Each beamsplitter 112 splits the path once, and the total number of beamsplitters required depends on the number of planes of acquisition. In some paths, an additional mirror (not shown) will be required to maintain identical mirroring at the sensors.

Figure 16:
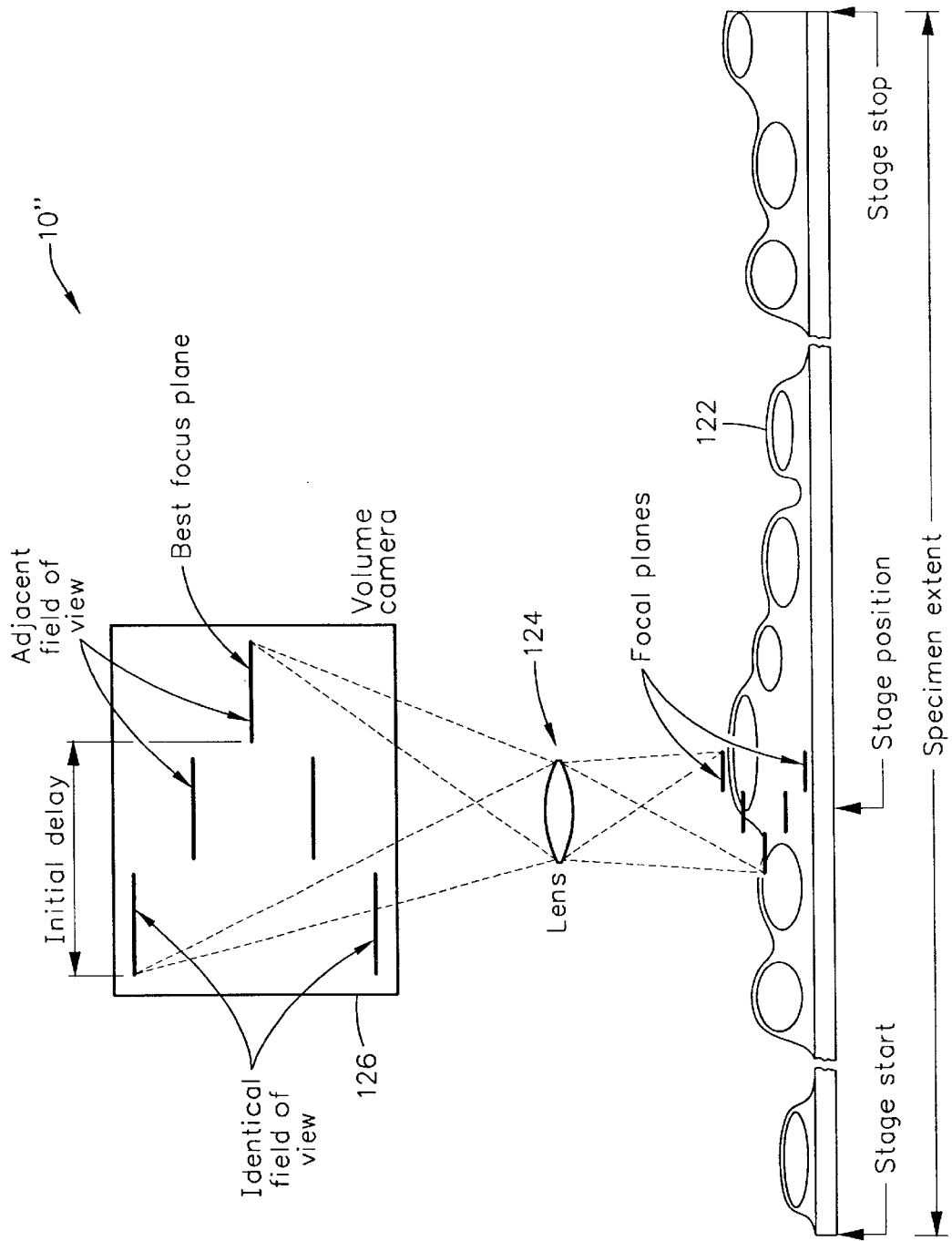
FIG. 16 is a schematic view of an embodiment of a volume imaging apparatus for continuous imaging a microscopic specimen using several sensors positioned at different axial and lateral locations each corresponding to unique focal planes.

Another embodiment of a volume camera 10" of the invention is shown in FIG. 16. The specimen 122 is magnified by the objective lens assembly 124 and multiple planes within the specimen slide are in focus simultaneously. The lens assembly magnifies the specimen into the image space 126, where it is captured by several sensors positioned at difference axial and lateral locations. Each sensor in the array collects a unique focal plane and each corresponding image contains different in-focus and out-of-focus information.

While the foregoing has been with reference to specific embodiments of the invention, it will be appreciated by those skilled in the art that these are illustrations only and that changes in these embodiments can be made without departing from the principles of the invention, the scope of which is defined by the appended claims.

What is claimed is:

1. An apparatus for generating a volume image, comprising:

a plurality of imaging devices positioned at adjacent image planes;

at least one image device configured for being adjustably displaced at a predetermined depth of focus; and a focusing device for selecting an optimum depth of focus at which to generate an image representation of an image object of the volume image, and for selecting the optimum depth of focus by selecting one of the imaging devices associated with the optimum depth of focus.

2. The apparatus of claim 1, further comprising an image forming device coupled to the plurality of imaging devices for forming a plurality of electronic representations representing images at respective image planes of the plurality of image planes.

3. The apparatus of claim 1, further comprising an image forming device coupled to the plurality of imaging devices for forming a plurality of electronic representations representing images at respective image planes of the plurality of image planes.

* * * * *